T. D. MORGAN.
Metallurgic-Furnace.

No. 163,795.  Patented May 25, 1875.

Witnesses: Frank J. Weisel, Robt Stuul

Inventor: Theophilus D. Morgan
by George H. Christy, his atty.

THE GRAPHIC CO.PHOTO-LITH.39 & 41 PARK PLACE, N.Y.

UNITED STATES PATENT OFFICE.

THEOPHILUS D. MORGAN, OF PITTSBURG, ASSIGNOR TO HIMSELF, DAVID MORGAN, OF SAME PLACE, AND HUGH McDONALD, OF ALLEGHENY, PENNSYLVANIA.

IMPROVEMENT IN METALLURGIC FURNACES.

Specification forming part of Letters Patent No. 163,795, dated May 25, 1875; application filed March 8, 1875.

*To all whom it may concern:*

Be it known that I, THEOPHILUS D. MORGAN, of Pittsburg, county of Allegheny, State of Pennsylvania, have invented or discovered a new and useful Improvement in Metallurgic Furnaces; and I do hereby declare the following to be a full, clear, concise, and exact description thereof, reference being had to the accompanying drawing making a part of this specification, in which—like letters indicating like parts—

Figure 1:
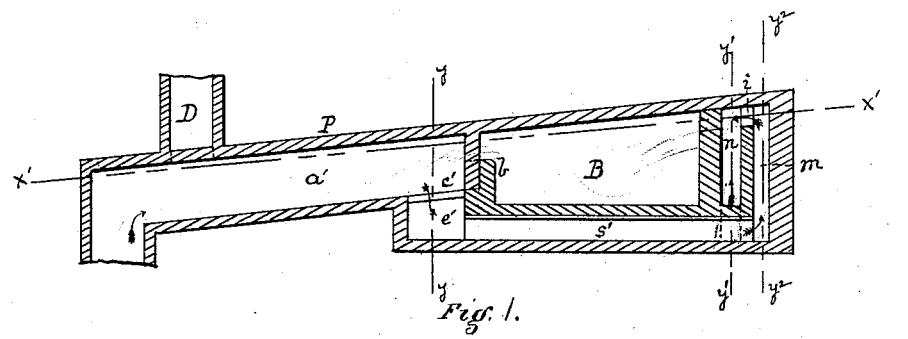
Figure 2:
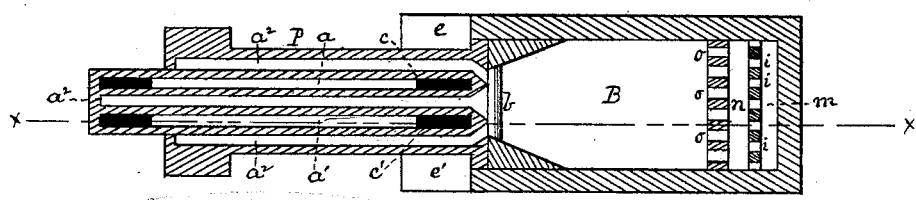
Figure 3:
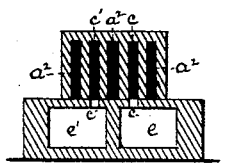
Figure 4:
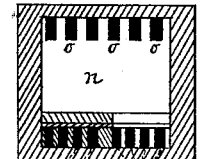
Figure 5:
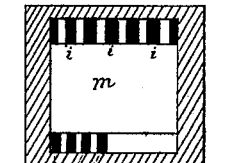

Figure 1 is a longitudinal vertical section of my improved metallurgic furnace, as formed by a plane passing through $x\ x$, Fig. 2. Fig. 2 is longitudinal horizontal sectional view, as formed by a plane along the line $x'\ x'$ Fig. 1; and Figs. 3, 4, and 5 are transverse vertical sectional views, as formed by planes passing along the line $y\ y$, $y^1\ y^1$, and $y^2\ y^2$, respectively, of Fig. 1.

At B I have shown the operating-chamber of a metallurgic furnace, which, so far the purposes of the present invention are concerned, may be of any desired form or construction, with reference to its use in roasting, calcining, heating, reheating, melting, puddling, boiling, or otherwise treating metals, metallic alloys, or compounds by heat. At D I have shown the ordinary stack. The neck P of the furnace, intermediate between the flue-bridge $b$ and the stack D, is preferably made a little longer than in the ordinary puddling-furnace— say, from twelve to fifteen feet in length, more or less—though the length may be varied at pleasure with reference to its heating capacity. The height of the flues inside I make from two to three feet, and their width about six inches, more or less. This neck P is divided into a series of flues, of which at least one, $a$, leads from any suitable connection with a gas-generator, producer, or holder, at outside of, or near the stack, and opens, by a diving-flue, $c$, into a chamber, $e$. Another flue, $a^1$, receives atphospheric air at the stack end, and conducts such air along, and by a diving-flue, $c'$, discharges it into the chamber $e'$. Alternately arranged with the flues $a\ a^1$ are the smoke-flues $a^2$, leading to the stack. The heated smoke or gases, or other products of combustion, passing back through the flues $a^2$, will heat the inclosing-walls so as thereby to heat the gas and air passing forward along the flues $a\ a^1$. From the chamber $e$ the gas passes along a flue, or a series of flues, $s$, under the furnace bed or operating chamber B, where it is still further heated, and in like manner the air from the chamber $e'$ is conducted along a like flue or series of flues, $s'$, and is heated in like manner. At the front or opposite end of the furnace are two up-take flues, $m\ n$, each extending across, or nearly across, the entire front end, and into one, $n$, the gas-flues $s$ discharge, and into the other, $m$, the air-flues $s'$ open in like manner. The heated air passes up the up-take flue $m$, and through a series of ports, $i\ i$, at or near the upper end of the separating wall, into the upper part of the up-take flue $n$, where it comes in contact, and is intermingled with heated gas arising in said flue. The two intermixed pass through a series of ports, $o$, in the upper part of the bridge-wall, and being now heated to the point of combustion, ignite, and act in the operating-chamber B in the usual manner.

Instead of the series of ports $i$ and $o$, a single broad opening at the upper end of each wall may be employed.

I do not limit myself to any particular number of flues for each of the purposes designated, as the number may be increased or diminished without departing from the scope of my invention.

The furnace is to have the necessary charging and tapping holes or other appliances, but which for clearness of illustration I have omitted in the drawing.

The furnace described, besides embodying the elements of utility commonly belonging to furnaces of this class, is cheaply made, as the building of the flues requires only straight brick-work of the simplest kind.

What I claim as my invention, and desire to secure by Letters Patent, is—

1. The neck of the ordinary metallurgic furnace, divided into alternately-arranged air, gas, and smoke flues $a\ a^1\ a^2$, the air and gas flues taking air and gas at the stack end of the neck, substantially as set forth.

2. The air and gas flues $a\ a^1$, arranged in the neck, alternately with the smoke-flues, and taking air and gas at the stack end of the neck, in combination with the flues $s\ s'$ under the bed of the furnace, and up-take flues $m\ n$, with their discharge-ports alternately arranged, substantially as set forth.

3. A system of gas and air flues, $a\ a^1\ s\ s'$, in combination with the up-take flues $m\ n$ and operating-chamber B, whereby the air and gas are heated, mixed, and ignited, substantially in the manner and for the purposes set forth.

In testimony whereof I have hereunto set my hand.

THEOPHILUS D. MORGAN.

Witnesses:
JAMES M. CHRISTY,
GEORGE H. CHRISTY.